(12) United States Patent
Uchiumi et al.

(10) Patent No.: US 8,690,644 B2
(45) Date of Patent: Apr. 8, 2014

(54) BORE WORKING TOOL

(75) Inventors: Satoru Uchiumi, Tochigi (JP); Naoya Matsunaga, Tochigi (JP); Masahiko Masuzaki, Tochigi (JP); Koji Saito, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 169 days.

(21) Appl. No.: 13/258,127

(22) PCT Filed: Mar. 31, 2010

(86) PCT No.: PCT/JP2010/055957
§ 371 (c)(1),
(2), (4) Date: Sep. 21, 2011

(87) PCT Pub. No.: WO2010/114076
PCT Pub. Date: Oct. 7, 2010

(65) Prior Publication Data
US 2012/0028550 A1    Feb. 2, 2012

(30) Foreign Application Priority Data

Mar. 31, 2009    (JP) .................................. 2009-085602

(51) Int. Cl.
*B24B 9/02*    (2006.01)
(52) U.S. Cl.
USPC ............. 451/464; 451/51; 451/486; 451/476; 451/478
(58) Field of Classification Search
USPC ................... 451/51, 464, 486, 476, 462, 478; 408/25, 27; 29/566.1
See application file for complete search history.

(56) References Cited

U.S. PATENT DOCUMENTS

| 1,305,759 | A | * | 6/1919 | Werneete ....................... 451/478 |
| 1,630,353 | A | * | 5/1927 | Pangborn et al. ............. 451/487 |
| 2,166,281 | A | * | 7/1939 | Beck .............................. 451/464 |
| 2,823,498 | A | * | 2/1958 | Saunders ....................... 451/540 |

(Continued)

FOREIGN PATENT DOCUMENTS

| CN | 1079684 A | 12/1993 |
| CN | 2442786 Y | 8/2001 |

(Continued)

OTHER PUBLICATIONS

CN Office Action issued on Dec. 9, 2013 in the corresponding CN patent application.

*Primary Examiner* — George Nguyen
(74) *Attorney, Agent, or Firm* — Carrier Blackman & Associates, P.C.; William D. Blackman; Joseph P. Carrier

(57) ABSTRACT

An arm 21 has a shape for grasping a part in a circumferential direction of a tool holder 7. The arm 21 is connected to the tool holder 7 with a bolt 23 inserted into a fixing hole 22 provided in a base side portion of the arm 21. A tapped hole 25 used for exchangeably attaching a cutting tool 24 is formed in a tip side portion of the arm 21. A groove part 26 extending in parallel to an axis of the tool holder 7 is formed in a position close to the base portion of the arm 21. Owing to the groove part 26, the arm 21 works as an elastic hinge when an external force is applied, so as to increase or decrease a radial dimension of the cutting tool 24 while keeping its parallelism to the axis of the tool.

5 Claims, 4 Drawing Sheets

(56) References Cited

U.S. PATENT DOCUMENTS

| | | | |
|---|---|---|---|
| 3,016,660 A * | 1/1962 | Gross | 451/478 |
| 3,216,155 A * | 11/1965 | Sunnen | 451/479 |
| 3,645,050 A * | 2/1972 | Croll et al. | 451/478 |
| 3,861,091 A * | 1/1975 | McDonald | 451/476 |
| 4,434,588 A * | 3/1984 | Wada et al. | 451/476 |
| 4,651,475 A * | 3/1987 | Appleby et al. | 451/470 |
| 4,980,996 A * | 1/1991 | Klink et al. | 451/51 |
| 4,991,361 A * | 2/1991 | Huppert et al. | 451/464 |
| 5,243,792 A | 9/1993 | Vanderwal, Jr. | |
| 5,443,417 A * | 8/1995 | Schimweg | 451/540 |
| 5,957,766 A | 9/1999 | Kalokhe et al. | |
| 6,325,575 B1 * | 12/2001 | Pawlik | 408/83.5 |
| 8,458,883 B2 * | 6/2013 | Uchiumi et al. | 29/455.1 |
| 2010/0251623 A1 * | 10/2010 | Uchiumi et al. | 51/293 |

FOREIGN PATENT DOCUMENTS

| | | |
|---|---|---|
| CN | 201154457 Y | 11/2008 |
| CN | 201198113 Y | 2/2009 |
| EP | 0060197 A1 | 9/1982 |
| FR | 2572978 A1 | 5/1986 |
| GB | 352 729 A | 7/1931 |
| GB | 1496234 A | 12/1977 |
| JP | 57-186257 U | 11/1982 |
| JP | 63-44757 U | 3/1988 |
| JP | 5-285804 A | 11/1993 |
| JP | 5-285824 A | 11/1993 |
| JP | 10-58303 A | 3/1998 |
| JP | 2003-165021 A | 6/2003 |
| JP | 2005-014175 A | 1/2005 |
| JP | 2008-044070 A | 2/2008 |

* cited by examiner

BORE WORKING TOOL

TECHNICAL FIELD

The present invention relates to a bore working tool for grinding (cutting) an inside of a hole formed in a work piece by using a drill or the like.

BACKGROUND ART

Patent Document 1 and Patent Document 2 disclose working tools in which a holder having a grind stone is rapidly rotated as a tool used for bore work of, for example, a crank journal bearing consisting of a combination of a cylinder block and a lower block, for finish of a hole formed by using a drill for attaining arbitrary dimensional accuracy or plane roughness, or for precision finish of the inside face of a cylinder.

PRIOR ART DOCUMENTS

Patent Documents

Patent Document 1: JP-2003-165021-A
Patent Document 2: JP-2005-014175-A

Patent Document 1 discloses, as a conventional example, a reamer including a plurality of rectangular recesses formed on the outer circumference of a holder, a blade (a grind stone) placed in each of the recesses, and a slider having a circular cone part provided inside a cylinder of the holder, so that the radial dimension of the blade may be adjusted by moving the slider.

Furthermore, Patent Document 1 discloses, as a modification of the conventional example, a structure in which a slit is formed in a position at the center between the ends along the longitudinal direction of each blade and close to the outer circumferential face and a through hole in a rectangular shape including and perpendicular to the slit is formed, so that the radial dimension of every blade may be finely adjusted by inserting a wedge into the through hole.

Furthermore, Patent Document 2 discloses a structure in which a grain part is formed by fixing abrasive grains on the outer circumferential face of a cylindrical part of a grind stone main body, a bevel lead angle part and a work dimension finishing part inclined to be tapered toward an edge of the grain part are formed in an end portion of the grain part, a grain part parallelism expanding part is formed by cutting the end portion of the grain part in a zigzag manner by a first slit and a second slit extending in an axial direction, a taper bore is formed over the whole length of the grain part parallelism expanding part on the inner circumferential face of the cylindrical part, and a taper cone is fit in the taper bore for positional adjustment along the axial direction, so that the grain part parallelism expanding part may be expanded to be parallel.

In the working tool disclosed in Patent Document 1, the rectangular recesses for holding the blades are formed in the holder, and in the working tool disclosed in Patent Document 2, the first slit and the second slit are formed in a zigzag manner.

A small space tends to be formed between each rectangular recess and the blade of Patent Document 1. Also, the slits of Patent Document 2 remain as spaces. As a result, abrasive powders and chips easily enter the recesses or the slits, which tends to cause a work failure.

Moreover, in the working tool of Patent Document 1, although protrusion lengths along the radial direction of the grind stones may be individually adjusted, the structure of the grind stones is complicated and the adjustment is troublesome.

SUMMARY OF INVENTION

According to one or more embodiments of the invention, a bore working tool is provided with a cylindrical tool holder; a plurality of grinding parts held on the tool holder with protrusion lengths thereof along a radial direction of the tool holder adjustable; and a draw bar slidably inserted into the tool holder for adjusting the protrusion lengths of the plurality of grinding parts along the radial direction by moving along an axial direction of the tool holder. Each of the plurality of grinding parts includes an arm in a shape for grasping a part along a circumferential direction of the tool holder and a cutting tool provided in a tip portion of the arm. The cutting tool may be a grind stone.

Herein, an expression "grinding" includes "cutting" with a reamer or the like.

The arm preferably has a structure for elastically pressing the grinding part against a surface to be worked. The arm is preferably made of a metal. The arm may include a groove part or a thin part extending in parallel to an axis of the tool holder between the tip portion and a base portion thereof. Owing to the groove part or the thin part, the arm preferably functions as an elastic hinge.

Furthermore, in order to finely adjust the protrusion length along the radial direction of each of the grinding parts, a through tapped hole may be formed in the arm along a thickness direction, and a screw for finely adjusting the protrusion length along the radial direction of each grinding part may be provided to be screwed into the through tapped hole.

Moreover, each of the arms is preferably attached with a portion connected to the tool holder disposed on an upstream side and the cutting tool disposed on a downstream side with respect to a rotation direction of the tool holder. If the arm is attached in an opposite position, a force for opening the arm is applied during the rotation, which is not preferred.

Furthermore, the plural arms (grinding parts) may be attached not only along the circumferential direction of the holder but also along the axial direction of the holder.

According to the bore working tool having the aforementioned structure, even when a plurality of grind stones provided to be spaced from one another along the circumferential direction are increased in their radial dimensions, the axis of the tool and the grinding faces of the plural grind stones may be kept in parallel to each other, and therefore, work accuracy may be kept high. Furthermore, the protrusion length along the radial direction of each grind stone may be easily externally changed, and in addition, a plurality of grinding parts may be provided on one holder to be spaced from one another along the axial direction, and hence, the bore working tool is effective even when apart to be worked is long or when there are a plurality of parts to be worked.

Moreover, since the bore working tool having the aforementioned structure has neither a slit nor a rectangular recess formed on the surface of the holder, abrasive powders and chips minimally enter the tool, and hence, a work failure is minimally caused.

Other aspects and advantages of the invention will be apparent from the following description and the appended claims.

DESCRIPTION OF EMBODIMENTS

Figure 1:
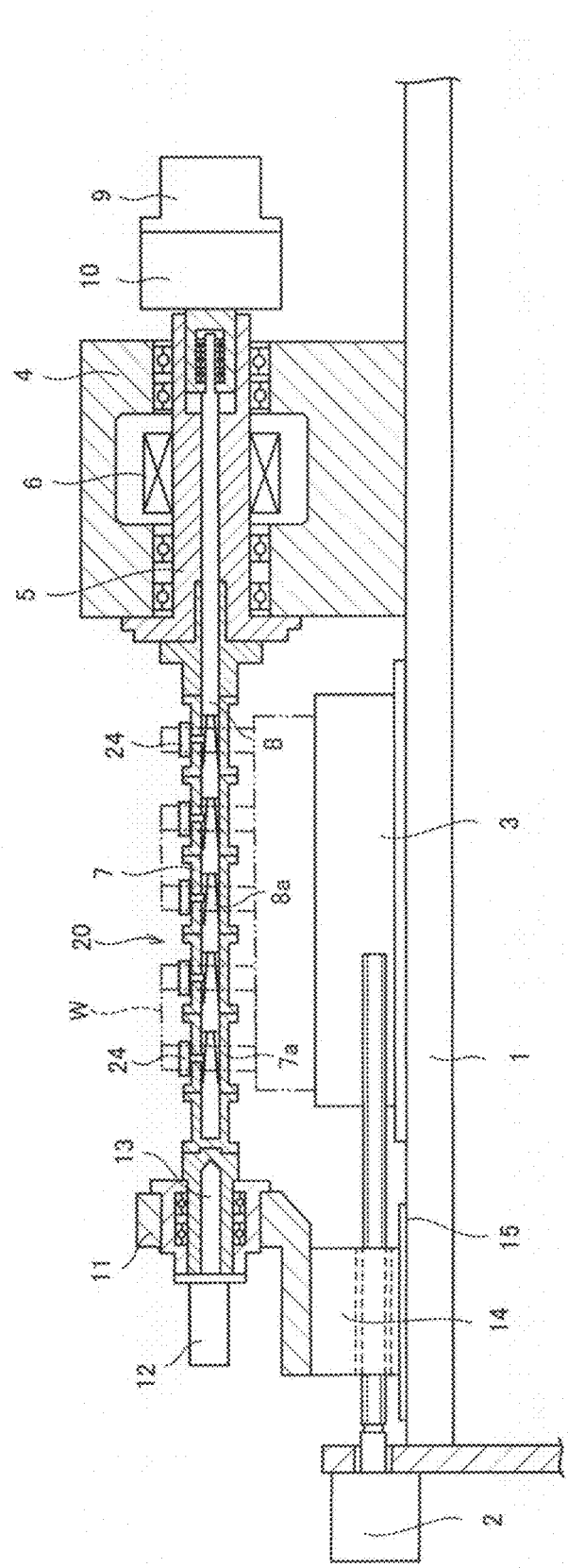
FIG. 1 is a cross-sectional view of a whole grinding machine to which a bore working tool according to an exemplary embodiment of the invention is applied.
Figure 2:
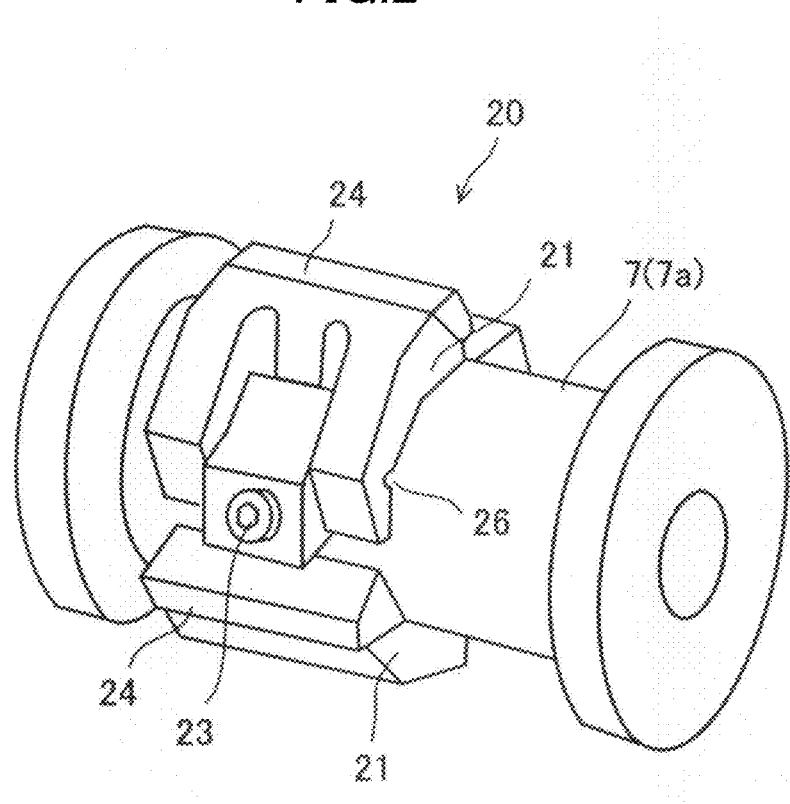
FIG. 2 is a perspective view of the bore working tool of the exemplary embodiment of the invention.
Figure 3:
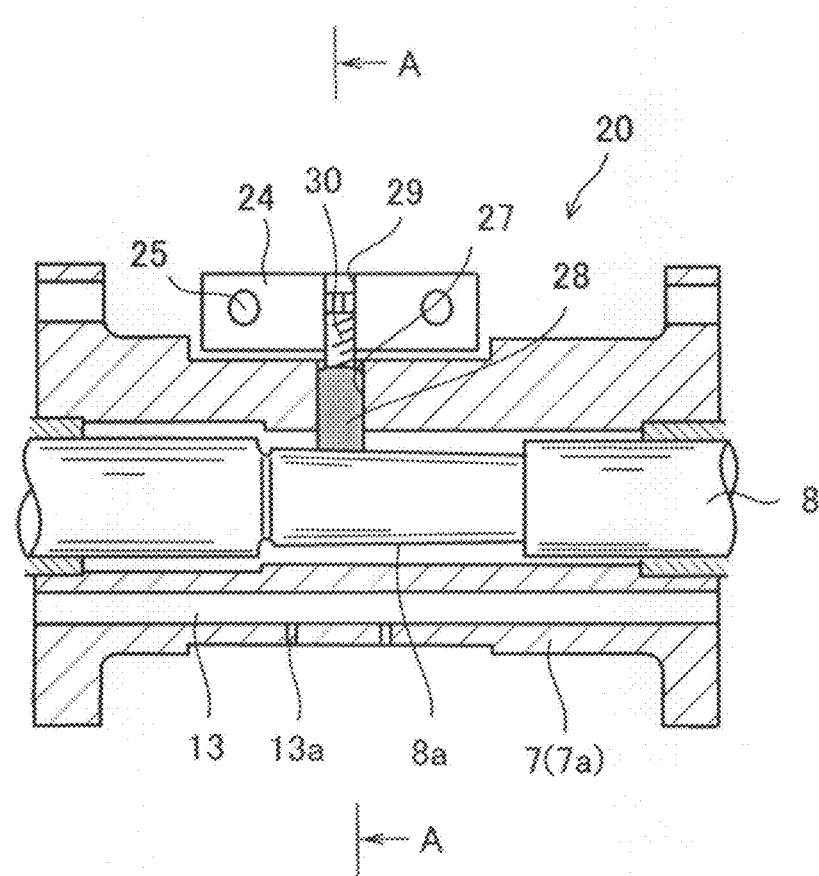
FIG. 3 is a cross-sectional view of the bore working tool.
Figure 4:
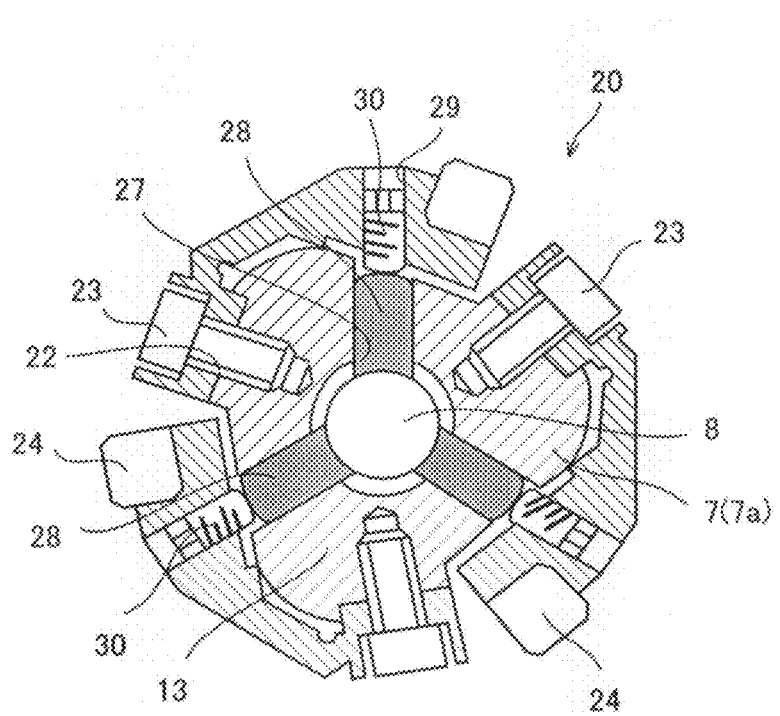
FIG. 4 is a cross-sectional view taken on line A-A of FIG. 3.

An exemplary embodiment of the invention will now be described with reference to the accompanying drawings.

In a grinding machine to which a bore working tool according to the exemplary embodiment is applied, a table 3 is movable owing to a ball screw rotated by a motor 2 mounted on a base 1, and a work piece W is fixed in position on the table 3. A main bearing 4 of the bore working tool is fixed on the base 1. The main bearing 4 rotatively holds a main axis 5.

The main axis 5 is rotated by a spindle motor 6. A tool holder 7 in a cylindrical shape is attached to one end of the main axis 5. In this embodiment, the tool holder 7 is formed by connecting a plurality of split tool holders 7a to one another in an axial direction.

A draw bar 8 is inserted into the tool holder 7. A base portion of the draw bar 8 penetrates the main axis 5. A tip portion of the draw bar 8 is connected to a draw member 10 moved in the axial direction by a thrust motor 9.

A tip portion of the tool holder 7 is rotatively held by a spindle bearing 11. The tip portion of the tool holder 7 is provided with a coolant supply part 12. A coolant is fed from this coolant supply part 12 to a coolant passage 13 formed along the axial direction of the tool holder 7. The coolant is supplied toward a face to be ground through a nozzle 13a formed in the tool holder 7.

The spindle bearing 11 is supported on a table 14 provided on the base 1. The table 14 is engaged with a rail 15 provided on the base 1 so as to be movable.

A bore working tool 20 of this embodiment is disposed in a position corresponding to each bearing where the grinding is performed. The bore working tool 20 includes, in addition to the tool holder 7 and the drawbar 8, an arm 21 corresponding to a part of a grinding part. The draw bar 8 includes a taper part 8a for increasing/decreasing the radial dimension of the arm 21 with its base portion as the center.

The arm 21 is made of, for example, a metal and is in a shape for grasping a part in the circumferential direction of the tool holder 7. The arm 21 is connected to the tool holder 7 by inserting a bolt 23 into a fixing hole 22 formed in a base side portion of the arm 21. In a tip side portion of the arm 21, a tapped hole 25 used for exchangeably attaching a grind stone 24 working as a cutting tool is formed. It is noted that diamond grains or CBN is fixed on the surface of the grind stone 24 through electrolytic deposition. Alternatively, a cutting tool other than the grind stone may be attached.

In this embodiment, three arms 21 are attached onto the tool holder 7 in positions corresponding to the respective bearings at equal intervals along the circumferential direction of the tool holder 7 so as to be balanced for rotation. In the case where a plurality of grind stones are provided to be spaced from one another along the circumferential direction in this manner, even when the radial dimension of the grind stones is increased, the axis of the tool and the grinding faces of the plural grind stones may be kept in parallel, and therefore, work accuracy may be kept high. Furthermore, along the axial direction of the draw bar 8, the arms 21 disposed in the respective positions are provided in positions shifted in the axial direction.

In a portion close to the base portion of each arm 21, a groove part 26 extending in the width direction of the arm 21 is formed. The groove part 26 is in parallel to the axis of the tool holder 7 when the arm 21 is attached to the tool holder 7. The groove part 26 works as an elastic hinge when external force is applied, so as to increase or decrease the radial dimension of the grind stone 24 while keeping the parallelism to the axis of the tool.

Instead of forming the groove part 26, a thin part 26 may be formed in the middle between the base portion and the tip portion as far as the rigidity may be kept.

Furthermore, a through hole 27 extending in the radial direction is formed in the tool holder 7. A pin 28 is placed in the through hole 27. One end of the pin 28 is in contact with the taper part 8a of the draw bar 8.

A tapped hole 29 is formed to penetrate a portion close to the tip portion of the arm 21 along the thickness direction. An adjustable screw 30 is provided in this tapped hole 29. One end of the adjustable screw 30 is in contact with the other end of the pin 28.

In order to adjust protrusion lengths along the radial direction of all the grind stones 24, the draw bar 8 is moved in the axial direction. When the draw bar 8 is moved in the axial direction, the pins 28 are moved in the radial direction, and the arms 21 in contact with the pins 28 are opened or closed with the groove parts 26 as the centers, and thus, the protrusion lengths along the radial direction of all the grind stones 24 may be adjusted.

Alternatively, when the protrusion length along the radial direction of each grind stone 24 is to be adjusted, the adjustable screw 30 is screwed so as to adjust a distance between the pin 28 and the arm 21, and thus, the adjustment for each grind stone 24 may be performed. In this case, since the adjustable screw 30 is exposed on the outer circumferential face of the tool, the adjustment may be easily carried out.

When the adjustment is completed through the aforementioned procedures, the center of a bore of the work piece placed on the table 3 is made to accord with the axial center of the working tool, and the table 3 is moved along the axis of the tool holder 7 rapidly rotating, so as to grind the bore of the work piece. At this point, the rotation direction of the tool holder 7 is determined so that the base portions of the arms 21 may be disposed on the upstream side of the grindstones 24 with respect to the rotation direction.

The grind stone of the bore working tool of this embodiment is attached on the arm, and the arm is connected to the tool holder at one end thereof. In other words, the bore working tool of this embodiment does not employ the conventional structure in which the grind stone appears through the slit, and therefore, there is no place where abrasive powders and chips enter during the rotation grinding, and hence the working tool is free from a work failure.

INDUSTRIAL APPLICABILITY

The bore working tool of the present invention is applicable in a field for grinding inner circumferential faces of journal bearings and the like.

DESCRIPTION OF REFERENCE NUMERALS

1 . . . base, 2 . . . motor, 3 . . . table, 4 . . . main bearing, 5 . . . main axis, 6 . . . spindle motor, 7 . . . tool holder, 7a . . . split tool holder, 8 . . . draw bar, 8a . . . taper part of the draw bar, 9 . . . thrust motor, 10 . . . draw member, 11 . . . spindle bearing, 12 . . . coolant supply part, 13 . . . coolant passage, 13a . . . nozzle, 14 . . . table, 15 . . . rail, 20 . . . bore working tool, 21 . . . arm, 22 . . . fixing hole, 23 . . . bolt, 24 . . . grind stone, 25 . . . tapped hole, 26 . . . groove part, 27 . . . through hole, 28 . . . pin, 29 . . . tapped hole, 30 . . . adjustable screw, W . . . work piece

The invention claimed is:

1. A bore working tool, comprising:
a cylindrical tool holder;
a plurality of grinding parts held on the tool holder with protrusion lengths thereof being adjustable in a radial direction of the tool holder; and
a draw bar slidably inserted into the tool holder and configured to adjust the protrusion lengths of the grinding parts in the radial direction by moving in an axial direction of the tool holder,
wherein each of the plurality of grinding parts includes an arm having a shape of grasping a part of the tool holder in a circumferential direction, and a cutting tool provided in a tip portion of the arm,
and wherein a groove part or a thin part extending in parallel to an axis of the tool holder is formed between the tip portion and a base portion of each arm, and the groove part or the thin part makes the arm work as an elastic hinge.

2. The bore working tool according to claim 1, wherein the cutting tool is a grind stone.

3. The bore working tool according to claim 1, wherein a through tapped hole is formed in each arm along a thickness direction, and a screw configured to finely adjust the protrusion length in the radial direction of each of the grinding parts is provided to be screwed into the through tapped hole.

4. The bore working tool according to claim 1, wherein the arms are disposed on the tool holder at equal intervals along the circumferential direction of the tool holder, and wherein each arm is attached onto the tool holder with a portion connected to the tool holder disposed on an upstream side and the cutting tool disposed on a downstream side with respect to a rotation direction of the tool holder.

5. The bore working tool according to claim 1, wherein the arms are attached onto the tool holder to be spaced from one another along the axial direction of the tool holder, and wherein the arms spaced from one another along the axial direction are disposed in positions shifted in the circumferential direction of the tool holder when seen from the axial direction.

\* \* \* \* \*